A. D. TAIT.
DUMPING TRUCK.
APPLICATION FILED JAN. 25, 1919. RENEWED NOV. 6, 1919.

1,344,100.

Patented June 22, 1920.
2 SHEETS—SHEET 1.

Inventor:
Alfred D. Tait
By
Attys

A. D. TAIT.
DUMPING TRUCK.
APPLICATION FILED JAN. 25, 1919. RENEWED NOV. 6, 1919.

1,344,100.

Patented June 22, 1920.
2 SHEETS—SHEET 2.

Inventor:
Alfred D. Tait
By Gillson & Gillson
Attys.

UNITED STATES PATENT OFFICE.

ALFRED D. TAIT, OF EVANSTON, ILLINOIS.

DUMPING-TRUCK.

1,344,100. Specification of Letters Patent. Patented June 22, 1920.

Application filed January 25, 1919, Serial No. 273,105. Renewed November 6, 1919. Serial No. 336,230.

*To all whom it may concern:*

Be it known that I, ALFRED D. TAIT, a citizen of the United States, and resident of Evanston, county of Cook, and State of Illinois, have invented certain new and useful Improvements in Dumping-Trucks, of which the following is a specification, and which are illustrated in the accompanying drawings, forming a part thereof.

The invention relates to trucks, preferably power driven, adapted to carry such bulk lading as coal, sand, or other material, which may be discharged by a dumping action; and its objects are to provide improved means for dumping the load, and a construction which readily lends itself to large capacity vehicles.

The invention consists in a structure such as is hereinafter described and as illustrated in the accompanying drawings, in which—

Figure 1:
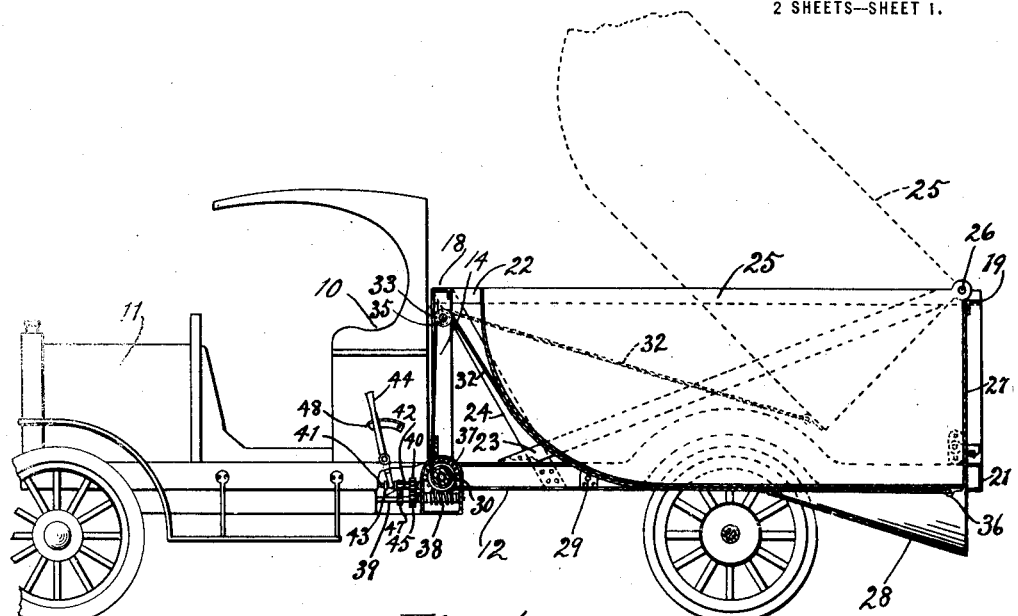
Figure 1 is a side elevation, partly in section, of the truck, the dumping body being shown in load-carrying position in solid lines and in dumping position in dotted lines.
Figure 2:
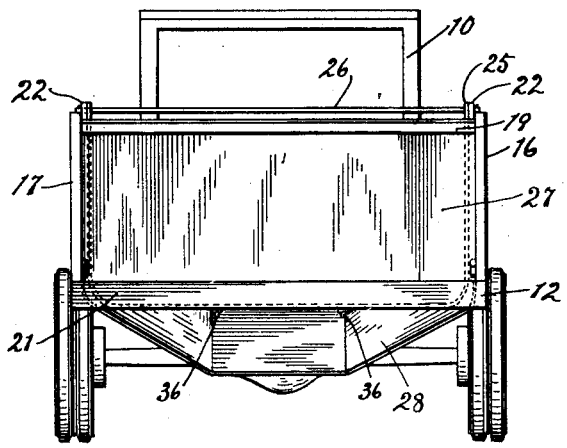
Fig. 2 is a rear elevation of the truck.
Figure 3:
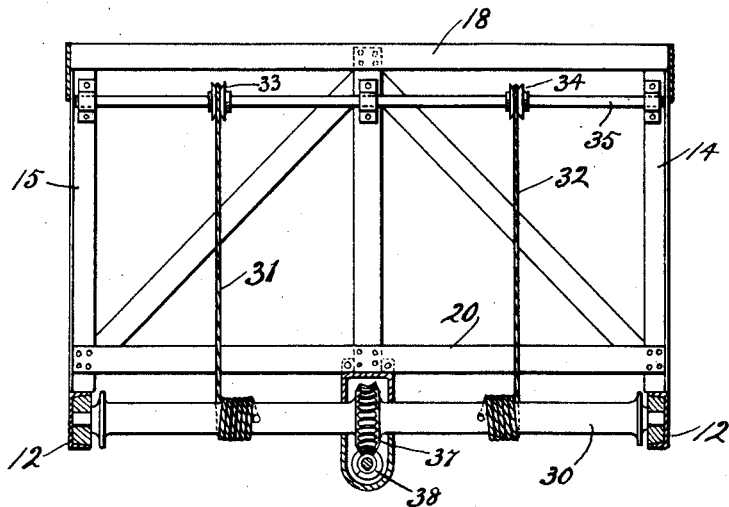
Fig. 3 is a transverse section showing the forward end of the body in elevation.
Figure 4:
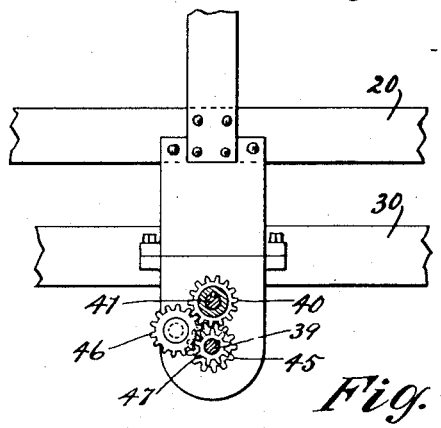
Fig. 4 is a detail of the gearing for effecting the dumping operation by power means.

The truck is illustrated as a four wheel automobile having a driver's cab 10, and a power plant located under the usual bonnet 11. The chassis 12 is a suitable framing which, when the vehicle has but four wheels, extends throughout the entire length of the truck.

Back of the cab 10 the chassis carries a strong upper framing comprising a pair of uprights 14, 15, at its forward end, and a pair of uprights 16, 17, at its rearward end; cross members 18, 19, connecting the upper ends of the forward and rearward uprights; cross members 20, 21, connecting the lower ends of the two pairs of uprights; longitudinal side members 22 connecting the upper ends of the front and rear uprights; and suitable braces, as 23, 24, for giving rigidity to the frame.

The load-carrying body takes the form of a bucket 25 fitting within the framework just described, and being open at its rearward end. The forward end of the bucket is shown as being curved upwardly, although this configuration is not material. The bucket is pivotally supported upon a cross-rod 26 secured upon the rear ends of the side members 22, and preferably forming an anchorage for the rear end of one pair of braces, as 23. The open rearward end of the bucket closes against a wall or header 27, which is carried by the upper framing and is preferably, though not necessarily, rigidly attached thereto.

A chute 28 is secured either rigidly or otherwise to the truck frame and across the bottom thereof, and is arranged to discharge backwardly. This chute receives the lading from the bucket when the latter is swung upwardly about the pivot rod 26 and discharges it from the truck. When the bucket is loaded its forward end is supported by any suitable means, such as a pair of blocks, as 29 (only one of which is shown) attached to the chassis.

For dumping the bucket there is provided a drum shaft 30, shown as journaled in the side members of the chassis 12, and a pair of cables 31, 32, attached to the shaft, leading over sheaves 33, 34, mounted on a rod 35 carried at the upper ends of the uprights 14, 15, the cables extending thence backwardly under the bucket and being attached thereto at its rearward end, as shown at 36. By winding the cables upon the drum shaft 30 the bucket is raised to the dotted line position of Fig. 1 and discharged of its contents.

Preferably the drum shaft is power driven, and for this purpose there is shown a worm gear 37, fixed upon the shaft and meshing with a worm 38 carried by a short shaft 39. The shaft 39 is driven, in the present instance, by a gear 40 splined upon a shaft 41, which may have connection with the motor mounted under the hood 11. The gear 40 is carried by a sleeve 42, mounted on the shaft 41 and provided with a pair of spaced collars 43, between which one end of a shipper lever 44 engages, this lever being so positioned as to be within easy reach of the operator occupying the cab. The shaft 41 may be constantly driven. By shifting the gear 40 to the left (Fig. 1) it is disengaged from the gear 45 mounted on the shaft 39, leaving the worm 38 at rest.

Preferably for the purpose of lowering the bucket there is provided a pair of reversing gears, one thereof, 46, being an idler mounted upon a shaft of its own and constantly meshing with a small gear 47 mounted on the shaft 39. By shifting the gear 40 still farther to the left it meshes with the gear 46 and drives the worm in the reverse direction, through the medium of the gear 47. Preferably the gear 47 is smaller than the gear 45, in order that the lowering operation may be more quickly performed. The shipper lever 44 may coöperate with an ordinary notched quadrant 48 for holding it in any one of its three positions.

The form of the bucket and of the framing within which it is mounted may be changed as desired with view to increasing the carrying capacity.

While an operative and preferred form of construction is shown and described, various changes may be made without departing from the scope of the invention.

I claim as my invention—

1. A dumping truck comprising a suitable framing and a body having an open end and being pivoted adjacent the upper portion of such end within the framing, a closure for the open end of the body arranged for maximum opening at the bottom, and means for swinging the body upon its pivot.

2. A dumping truck comprising a suitable framing and a body having an open end and being pivoted adjacent the upper portion of such end within the framing and a header against which the open end of the body abuts when in carrying position, and means for swinging the body upon its pivot, whereby movement of the body about its pivot will provide a discharge opening having a maximum width between the lower edges of the bottom and header.

3. A dumping truck comprising a suitable framing and a body having an open end and being pivoted adjacent the upper portion of such end within the framing and a fixed header against which the open end of the body abuts when in carrying position, and means for swinging the body upon its pivot.

4. A dumping truck comprising a suitable framing and a body having an open end and being pivoted adjacent the upper portion of such end within the framing and a header against which the open end of the body abuts when in carrying position whereby swinging of the body about its pivot produces a discharge opening at the lower edge of the header, means for swinging the body upon its pivot, and a chute located below the frame adjacent the header.

5. In an auto dump truck, in combination, a suitable framing, a motor, an open-ended body carried by the framing and pivoted thereto adjacent the upper portion of its open end, a closure for the open end of the body arranged for maximum opening at the bottom, a drum shaft, a cable attached to the shaft and to the body, and driving connection between the motor and the drum shaft.

ALFRED D. TAIT.